(12) United States Patent
Umeki

(10) Patent No.: US 11,292,426 B2
(45) Date of Patent: Apr. 5, 2022

(54) SEAT BELT DEVICE

(71) Applicant: Toyota Jidosha Kabushiki Kaisha, Toyota (JP)

(72) Inventor: Yoshinari Umeki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/930,908

(22) Filed: May 13, 2020

(65) Prior Publication Data

US 2020/0406856 A1    Dec. 31, 2020

(30) Foreign Application Priority Data

Jun. 28, 2019  (JP) .............................. JP2019-120957

(51) Int. Cl.
*B60R 22/22*  (2006.01)
(52) U.S. Cl.
CPC .................................... *B60R 22/22* (2013.01)
(58) Field of Classification Search
CPC ............ B60R 22/22; B60R 2022/1806; B60R 2022/266
See application file for complete search history.

(56) References Cited

U.S. PATENT DOCUMENTS

2014/0373313 A1* 12/2014 Haas ....................... B60R 22/18
24/302

FOREIGN PATENT DOCUMENTS

| CN | 106882147 A | * | 6/2017 | ............ B60R 22/26 |
| DE | 202016001111 U1 | * | 5/2017 | ............ B60R 22/22 |
| FR | 3076514 B1 | * | 8/2020 | ............ B60R 22/18 |
| GB | 2515738 A | * | 1/2015 | ............ B60R 22/22 |
| JP | S59-004822 Y2 | | 2/1984 | |
| JP | H06-075925 U | | 10/1994 | |
| JP | 2019214293 A | * | 12/2019 | ............ B60R 22/26 |
| KR | 100836084 B1 | * | 6/2008 | ............ B60R 22/22 |
| KR | 20090040953 A | * | 4/2009 | ............ B60R 22/22 |

OTHER PUBLICATIONS

Translation of JP 2019214293 A, obtained from Global Dossier May 20, 2021 (Year: 2018).*

* cited by examiner

*Primary Examiner* — James A English
(74) *Attorney, Agent, or Firm* — Dinsmore & Shohl LLP

(57) ABSTRACT

A stopper that stops both seat belt anchorages, namely, a seat belt anchorage for a side seat and a seat belt anchorage for a center seat from rotating relatively to each other is provided. Besides, a coupling portion of the seat belt anchorage for the center seat is arranged such that a force is applied to the seat belt anchorage for the center seat in such a direction as to restrain the seat belt anchorage for the side seat from rotating forward with respect to a vehicle. Accordingly, the seat belt anchorage for the side seat can be restrained from rotating forward with respect to the vehicle due to the seat belt anchorage for the center seat, and an inter-EAP distance can be restrained from becoming short.

10 Claims, 10 Drawing Sheets

SEAT BELT DEVICE

CROSS-REFERENCE TO RELATED APPLICATIONS

This application claims priority to Japanese Patent Application No. 2019-120957 filed on Jun. 28, 2019, which is incorporated herein by reference in its entirety including the specification, drawings and abstract.

BACKGROUND

1. Technical Field

The disclosure relates to a vehicle seat belt device that is fixed to a vehicle body floor through the use of a seat belt anchorage.

2. Description of Related Art

Japanese Examined Utility Model Application Publication No. 59-004822 discloses a seat belt device having a seat belt for a rear seat that is fixed to a vehicle body floor through the use of a seat belt anchorage.

As shown in FIG. 10, as for rear seats, there are two seat belt anchorages for a right side seat and a left side seat, on an outer side and a center side in a vehicle width direction, respectively, and there are also two seat belt anchorages for a center seat, spaced apart from each other in the vehicle width direction. These seat belt anchorages are fixed to a vehicle body floor. Moreover, that one of two seat belt anchorages 1a and 1b for the side seats which is located on the center side in the vehicle width direction, namely, the seat belt anchorage 1b, and each of seat belt anchorages 2 for the center seat may be fastened together by a single bolt.

In this case, in a seat belt anchorage strength test complying with FMVSS, ECE, ADR, and regulations in Japan or the like, when a body block simulating a human being is fixed to a rear seat by a seat belt webbing and pulled forward with respect to the vehicle at a certain load (at about 13.5 kN according to a three-point belt system), a force F is applied to both the two seat belt anchorages 1b and 2 for the side seat and the center seat that are fastened together, forward with respect to the vehicle, and the two seat belt anchorages 1b and 2 may rotate together forward with respect to the vehicle, as shown in FIGS. 10 and 11. Then, when the two seat belt anchorages 1b and 2 that are fastened together rotate forward with respect to the vehicle, an inter-effective anchor point (EAP) distance D between the two seat belt anchorages 1a and 1b, namely, the seat belt anchorage for the side seat on the outer side in the vehicle width direction and the seat belt anchorage for the side seat on the center side in the vehicle width direction becomes short.

SUMMARY

It is an object of the disclosure to provide a seat belt device that can restrain an inter-EAP distance between two seat belt anchorages for a side seat on an outer side and on a center side in a vehicle width direction from becoming short, when conducting a seat belt anchorage strength test.

The disclosure that achieves the aforementioned object is as follows.

(1) A seat belt device is fixed to a vehicle body floor through the use of a seat belt anchorage. The seat belt anchorage has a seat belt anchorage for a side seat and a seat belt anchorage for a center seat that are fastened together to the vehicle body floor. The seat belt anchorage for the side seat and the seat belt anchorage for the center seat are equipped with fastening portions that are fastened to the vehicle body floor, and coupling portions that are coupled to seat belts, respectively, and are fastened together to the vehicle body floor at the fastening portions respectively. At least one of the seat belt anchorage for the side seat and the seat belt anchorage for the center seat is provided with a stopper that stops both the seat belt anchorages from rotating relatively to each other by coming into contact with the other seat belt anchorage. The coupling portion of the seat belt anchorage for the center seat is arranged such that a force is applied to the seat belt anchorage for the center seat in such a direction as to restrain the seat belt anchorage for the side seat from rotating forward with respect to the vehicle, when a force is applied to both the seat belt anchorage for the side seat and the seat belt anchorage for the center seat forward with respect to the vehicle.

(2) In the seat belt device set forth in (1), the coupling portion of the seat belt anchorage for the center seat is arranged such that a rotating force is applied to the seat belt anchorage for the center seat in a direction opposite to a rotating force that is applied to the seat belt anchorage for the side seat, or that the rotating force of the seat belt anchorage for the center seat becomes equal to zero, when a force is applied to both the seat belt anchorage for the side seat and the seat belt anchorage for the center seat forward with respect to the vehicle.

(3) In the seat belt device set forth in (1) or (2), the coupling portion of the seat belt anchorage for the side seat is arranged closer to a center side in a width direction of the vehicle than the coupling portion of the seat belt anchorage for the center seat.

(4) In the seat belt device set forth in any one of (1) to (3), a fitting hole in which the stopper is fitted is formed through the other seat belt anchorage with which the stopper comes into contact, and the seat belt anchorage for the side seat and the seat belt anchorage for the center seat are fastened together to the vehicle body floor, with the stopper fitted in the fitting hole.

(5) In the seat belt device set forth in any one of (1) to (4), each of the seat belt anchorage for the side seat and the seat belt anchorage for the center seat is provided with only the single fastening portion, and the seat belt anchorage for the side seat and the seat belt anchorage for the center seat are fastened together to the vehicle body floor through the use of a single bolt.

The seat belt device of the aforementioned (1) can achieve the following effect.

(a) At least one of the seat belt anchorage for the side seat and the seat belt anchorage for the center seat is provided with the stopper that stops both the seat belt anchorages from rotating relatively to each other by coming into contact with the other seat belt anchorage. Therefore, both the seat belt anchorages can be restrained from rotating relatively to each other when a force is applied to both the seat belt anchorages forward with respect to the vehicle.

Besides, (b) the coupling portion of the seat belt anchorage for the center seat is arranged such that a force is applied to the seat belt anchorage for the center seat in such a direction as to restrain the seat belt anchorage for the side seat from rotating forward with respect to the vehicle, when a force is applied to both the seat belt anchorage for the side seat and the seat belt anchorage for the center seat forward with respect to the vehicle. Therefore, both the seat belt anchorages can be restrained from rotating together.

Owing to the aforementioned (a) and (b), when a force is applied to both the seat belt anchorage for the side seat and the seat belt anchorage for the center seat forward with respect to the vehicle, the seat belt anchorage for the side seat can be restrained from rotating forward with respect to the vehicle due to the seat belt anchorage for the center seat. In consequence, when conducting a seat belt anchorage strength test, the inter-EAP distance between the two seat belt anchorages for the side seat on the outside and on the center side in the vehicle width direction can be restrained from becoming short.

The seat belt device of the aforementioned (2) can achieve the following effect.

The coupling portion of the seat belt anchorage for the center seat is arranged such that a rotating force is applied to the seat belt anchorage for the center seat in the direction opposite to a rotating force that is applied to the seat belt anchorage for the side seat, or that the rotating force of the seat belt anchorage for the center seat becomes equal to zero, when a force is applied to both the seat belt anchorage for the side seat and the seat belt anchorage for the center seat forward with respect to the vehicle. Therefore, the force can be applied to the seat belt anchorage for the center seat in such a direction as to restrain the seat belt anchorage for the side seat from rotating forward with respect to the vehicle.

The seat belt device of the aforementioned (3) can achieve the following effect.

The coupling portion of the seat belt anchorage for the side seat is arranged closer to the center side in the width direction of the vehicle than the coupling portion of the seat belt anchorage for the center seat. Therefore, the inter-EAP distance between the two seat belt anchorages for the side seat on the outside and on the center side in the vehicle width direction can be made longer than in the case where the coupling portion of the seat belt anchorage for the side seat is arranged outside the coupling portion of the seat belt anchorage for the center seat in the width direction of the vehicle.

The seat belt device of the aforementioned (4) can achieve the following effect.

The fitting hole in which the stopper is fitted is formed through the other seat belt anchorage with which the stopper comes into contact, and the seat belt anchorage for the side seat and the seat belt anchorage for the center seat are fastened together to the vehicle body floor, with the stopper fitted in the fitting hole. Therefore, the seat belt anchorage for the side seat and the seat belt anchorage for the center seat can be reliably restrained from rotating relatively to each other.

The seat belt device of the aforementioned (5) can achieve the following effect.

Each of the seat belt anchorage for the side seat and the seat belt anchorage for the center seat is provided with only the single fastening portion, and the seat belt anchorage for the side seat and the seat belt anchorage for the center seat are fastened together (fastened) to the vehicle body floor through the use of the single bolt. Therefore, the number of parts and the number of man-hours for fastening can be made smaller and a greater advantage is obtained in terms of cost, than in the case where the seat belt anchorage for the side seat and the seat belt anchorage for the center seat are fastened to the vehicle body floor at a plurality of points through the use of a plurality of bolts.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
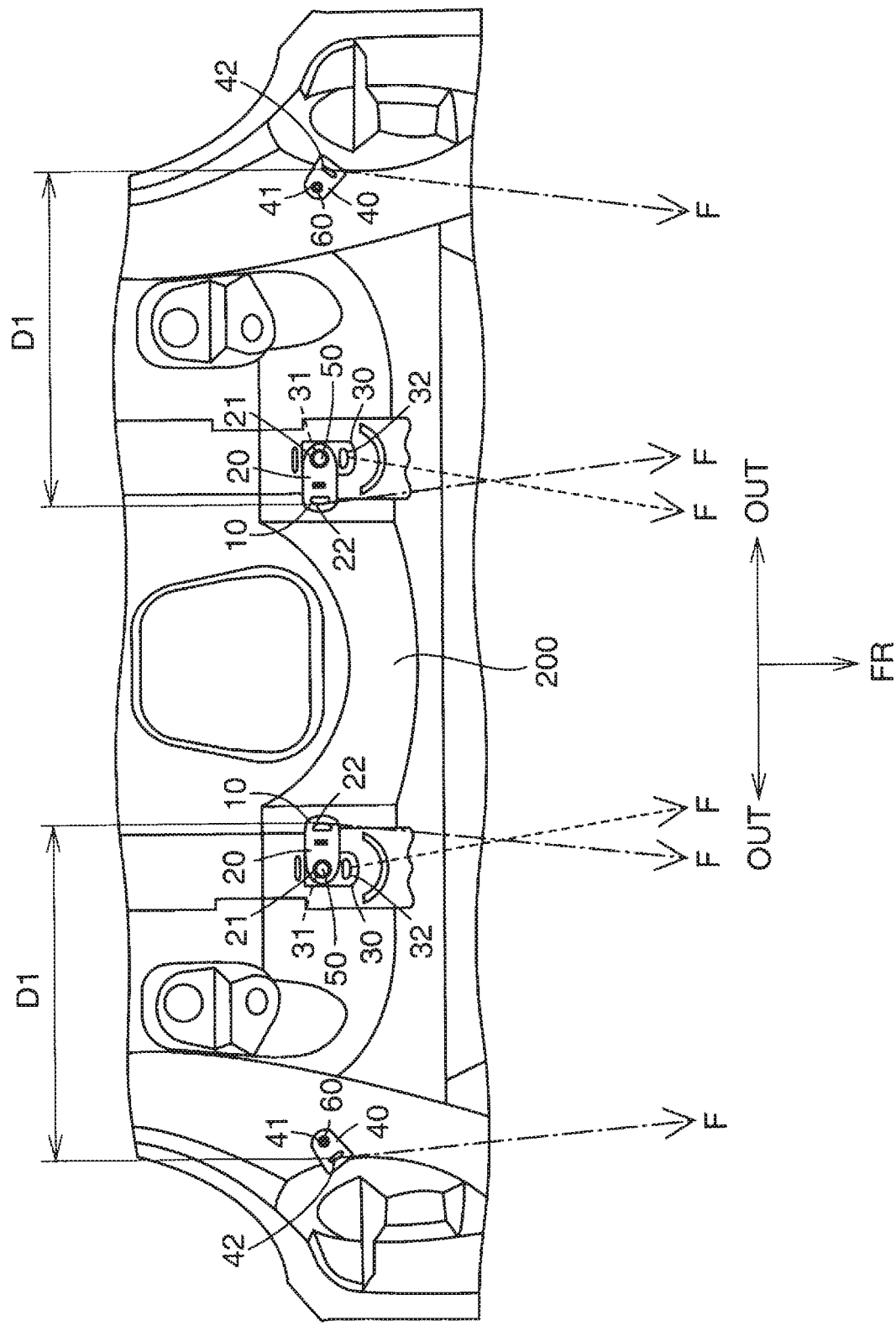
FIG. 1 is a plan view showing a positional relationship between seat belt anchorages for side seats and seat belt anchorages for a center seat that are used in a seat belt device according to one of the embodiments of the disclosure.

A seat belt device according to one of the embodiments of the disclosure will be described hereinafter with reference to the drawings. Incidentally, in the drawings, FR denotes a front side in a vehicle longitudinal direction (a longitudinal direction), and OUT denotes an outer side in a width direction of a vehicle (the outer side in the width direction).

A seat belt device 100 according to the present embodiment of the disclosure is, for example, a seat belt device for a rear seat of a vehicle in which three persons can sit side by side in the vehicle width direction. The seat belt device 100 is, for example, a three-point seat belt device having a shoulder belt portion and a lap belt portion.

Figure 3:
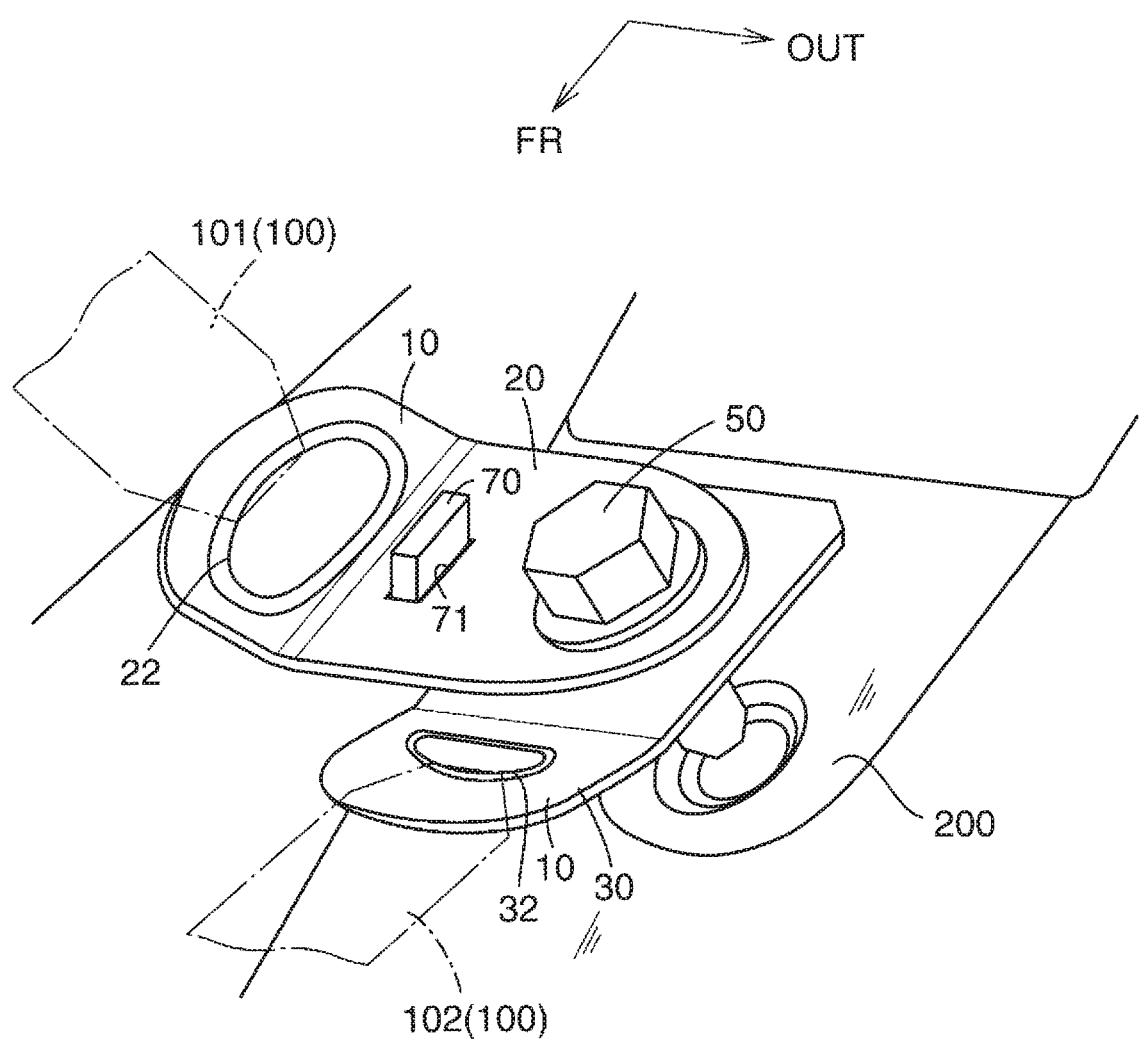
FIG. 3 is an enlarged perspective view of the seat belt anchorage for the side seat and the seat belt anchorage for the center seat that are used in the seat belt device according to the embodiment of the disclosure and that are fastened together.

As shown in FIG. 3, the seat belt device 100 is fixed to a vehicle body floor 200 through the use of a seat belt anchorage 10. As shown in FIG. 1, each of the seat belt anchorages 10 has a seat belt anchorage 20 for a side seat for fixing a seat belt device for the side seat on a right or left side of the vehicle in the seat belt device 100, and a seat belt anchorage 30 for a center seat for fixing a seat belt device for the center seat at a center in the vehicle width direction in the seat belt device 100.

Furthermore, each of the seat belt anchorages 10 has a second seat belt anchorage 40 for the side seat that is arranged outside and spaced apart from the seat belt anchorage 20 for the side seat in the vehicle width direction. The seat belt anchorage 20 for the side seat and the second seat belt anchorage 40 for the side seat are provided to fix the seat belt device for the side seat to the vehicle body floor 200.

The seat belt anchorage 20 for the side seat is provided with only a single fastening portion 21 that is fastened to the vehicle body floor 200, and only a single coupling portion 22 to which a seat belt 101 of the seat belt device for the side seat is coupled. Besides, the second seat belt anchorage 40 for the side seat is provided with only a single fastening portion 41 that is fastened to the vehicle body floor 200, and only a single coupling portion 42 to which the seat belt 101 of the seat belt device for the side seat is coupled. Incidentally, the seat belt 101 (see FIG. 3) of the seat belt device for the side seat may be a seat belt webbing that protects a passenger. The seat belt 101 may be a buckle webbing that extends downward toward the vehicle body floor 200 from an engageable and removable buckle (not shown), with a tongue plate (not shown) retained by the webbing and attached to the buckle.

As shown in FIG. 1, the two seat belt anchorages 30 for the center seat are provided apart from each other in the vehicle width direction. The seat belt anchorages 30 for the center seat are provided to fix the seat belt device for the center seat to the vehicle body floor 200.

Each of the seat belt anchorages 30 for the center seat is provided with only a single fastening portion 31 that is fastened to the vehicle body floor 200, and only a single coupling portion 32 to which a seat belt 102 of the seat belt device for the center seat is coupled. Incidentally, as is the case with the seat belt 101 of the seat belt device for the side seat, the seat belt 102 (see FIG. 3) of the seat belt device for the center seat may be a seat belt webbing. The seat belt 102 may be a buckle webbing that extends downward toward the vehicle body floor 200 from an engageable and removable buckle (not shown), with a tongue plate (not shown) retained by the webbing and attached to the buckle.

Figure 4:
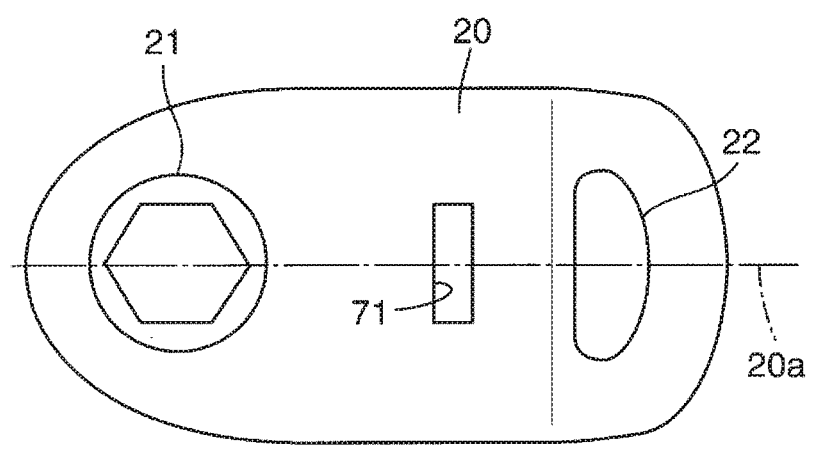
FIG. 4 is an enlarged plan view of the seat belt anchorage for the side seat that is used in the seat belt device according to the embodiment of the disclosure.
Figure 5A:
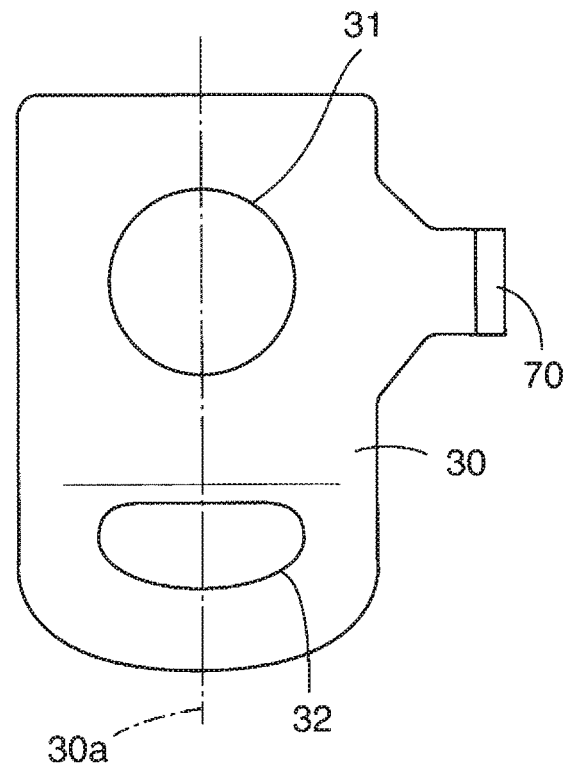
FIG. 5A is an enlarged plan view of the seat belt anchorage for the center seat that is used in the seat belt device according to the embodiment of the disclosure, and shows the seat belt anchorage for the center seat that is fastened together with the seat belt anchorage for the side seat on a right side of a vehicle.
Figure 5B:
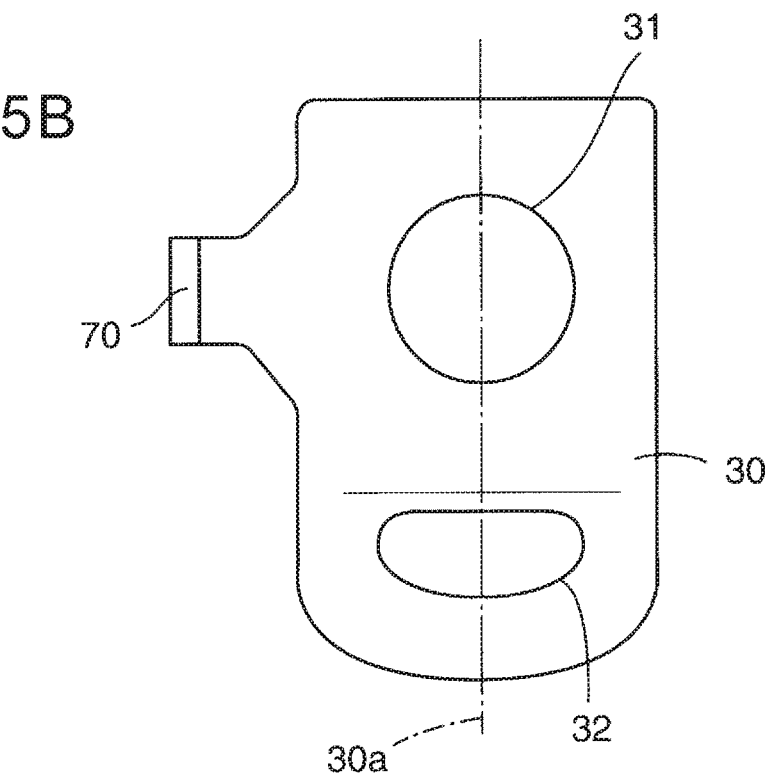
FIG. 5B is an enlarged plan view of the seat belt anchorage for the center seat that is used in the seat belt device according to the embodiment of the disclosure, and shows the seat belt anchorage for the center seat that is fastened together with the seat belt anchorage for the side seat on a left side of the vehicle.
Figure 6:
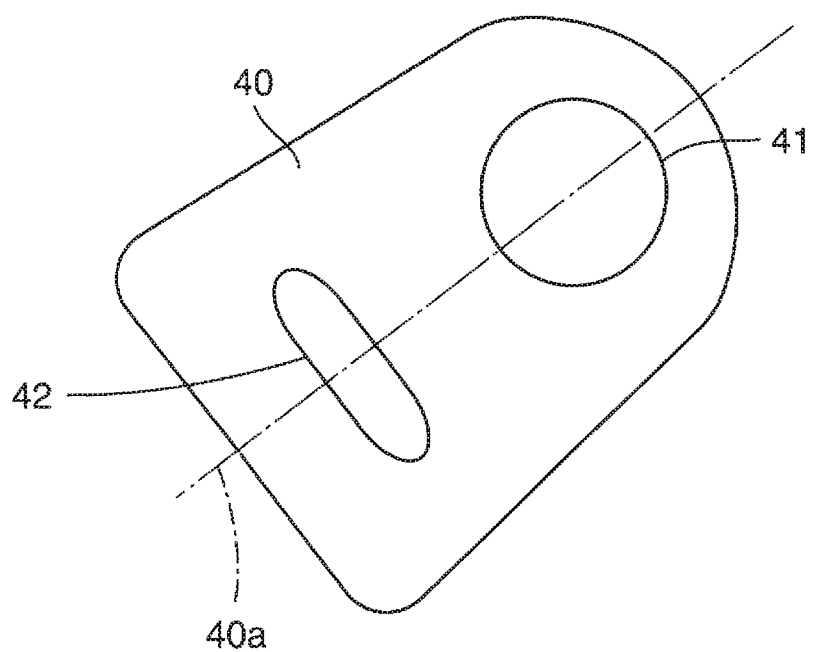
FIG. 6 is an enlarged plan view of a second seat belt anchorage for a side seat that is used in the seat belt device according to the embodiment of the disclosure.

As shown in FIGS. 4 to 6, each of the seat belt anchorage 20 for the side seat and the second seat belt anchorage 40 for the side seat is bilaterally symmetric. More specifically, the seat belt anchorage 20 for the side seat is bilaterally symmetric with respect to a centerline 20a in the width direction that passes through (a center of) the fastening portion 21 and (a center of) the coupling portion 22 of the seat belt anchorage 20 for the side seat. Besides, the second seat belt anchorage 40 for the side seat is bilaterally symmetric with respect to a centerline 40a in the width direction that passes through (a center of) the fastening portion 41 and (a center of) the coupling portion 42 of the second seat belt anchorage 40 for the side seat. Incidentally, each of the seat belt anchorages 30 for the center seat is not bilaterally symmetric with respect to a centerline 30a in the width direction that passes through (a center of) the fastening portion 31 and (a center of) the coupling portion 32 of each of the seat belt anchorages 30 for the center seat. This is because the gap between each of the seat belt anchorages 30 for the center seat and a vehicle seat (not shown) may become narrow. It should be noted, however, that each of the seat belt anchorages 30 for the center seat may be bilaterally symmetric with respect to the centerline 30a in the width direction.

Figure 7:
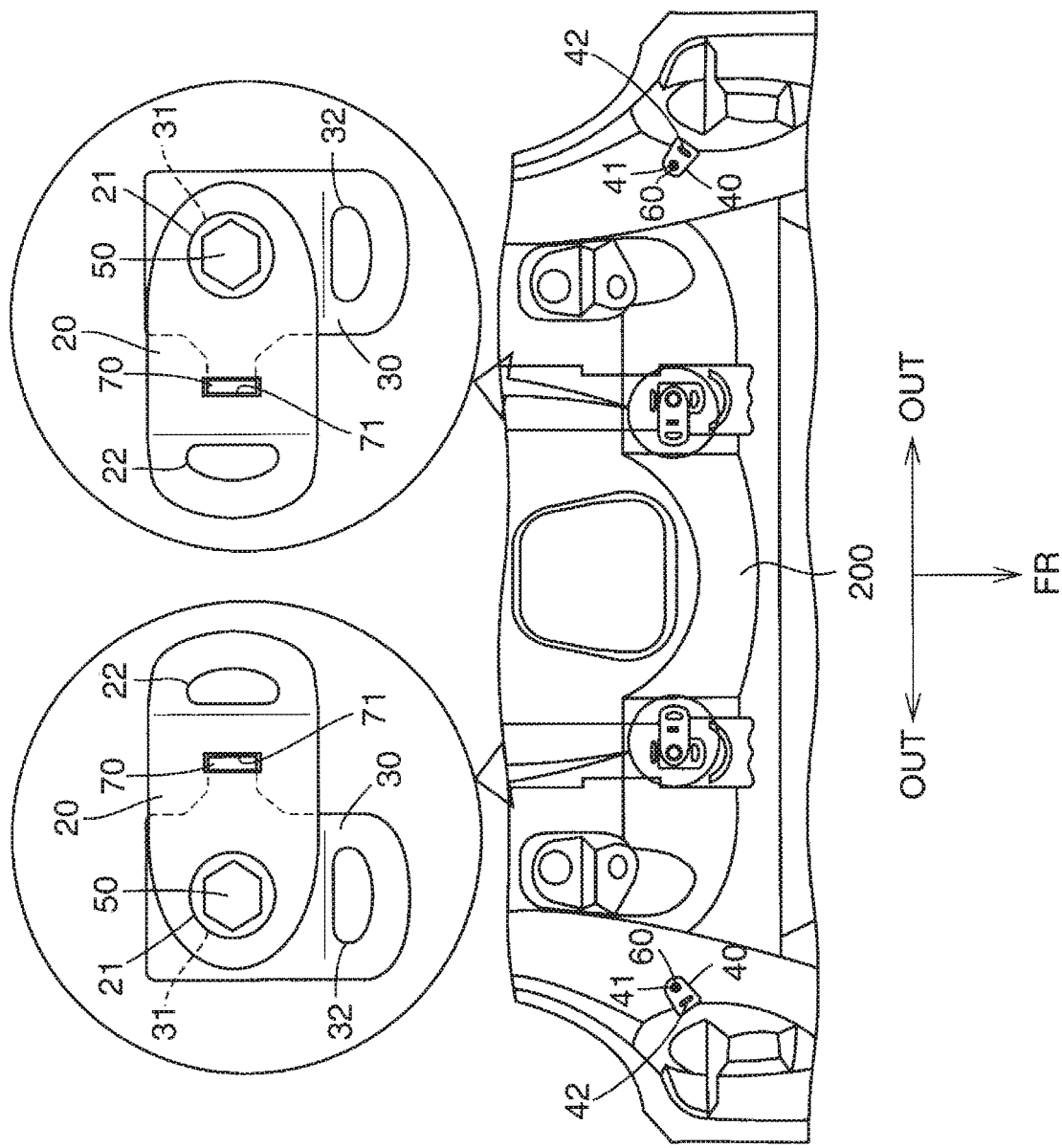
FIG. 7 is a plan view showing that the seat belt anchorages for the side seats that are used in the seat belt device according to the embodiment of the disclosure and that are fastened together with the seat belt anchorages for the center seat respectively are bilaterally symmetric.

As shown in FIG. 7, the seat belt anchorages 20 for the side seats are bilaterally symmetric. Therefore, the seat belt anchorage for the side seat for fixing the seat belt device for the side seat on the right side of the vehicle, and the seat belt anchorage for the side seat for fixing the seat belt device for the side seat on the left side of the vehicle can be shared in common. Besides, each of the second seat belt anchorages 40 for the side seats is bilaterally symmetric. Therefore, the second seat belt anchorage for the side seat for fixing the seat belt device for the side seat on the right side of the vehicle, and the second seat belt anchorage for the side seat for fixing the seat belt device for the side seat on the left side of the vehicle can be shared in common.

As shown in FIG. 1, each of the second seat belt anchorages 40 for the side seats is fastened, at the fastening portion 41 thereof, to the vehicle body floor 200 through the use of a single bolt 60. Each of the seat belt anchorages 20 for the side seats and each of the seat belt anchorages 30 for the center seat are fastened together (fastened), at the fastening portions 21 and 31 thereof, to the vehicle body floor 200 through the use of a single bolt 50.

The seat belt anchorage 20 for the side seat is arranged such that the coupling portion 22 is located closer to the center side in the vehicle width direction than the fastening portion 21. This is because a clearance between the coupling portion 22 of the seat belt anchorage 20 for the side seat and the coupling portion 42 of the second seat belt anchorage 40 for the side seat (an inter-effective anchor point (EAP) distance) D1 needs to be long. For a similar reason, the second seat belt anchorage 40 for the side seat is arranged such that the coupling portion 42 is located outside the fastening portion 41 in the vehicle width direction.

The coupling portion 22 of the seat belt anchorage for the side seat is arranged in such a manner as to be located closer to the center side in the vehicle width direction than the fastening portion 21. Therefore, when a force F is applied to the seat belt anchorage 20 for the side seat forward with respect to the vehicle in conducting a seat belt anchorage strength test, the seat belt anchorage 20 for the side seat may rotate around the fastening portion 21 forward with respect to the vehicle. When the seat belt anchorage 20 for the side seat rotates forward with respect to the vehicle, the coupling portion 22 of the seat belt anchorage 20 for the side seat moves outward in the vehicle width direction, and the inter-EAP distance D1 becomes short. Thus, in the disclosure, the seat belt anchorage 20 for the side seat is restrained from rotating forward with respect to the vehicle, through the use of the seat belt anchorage 30 for the center seat that is fastened together with the seat belt anchorage 20 for the side seat.

In concrete terms, the following configuration is adopted.

Figure 2:
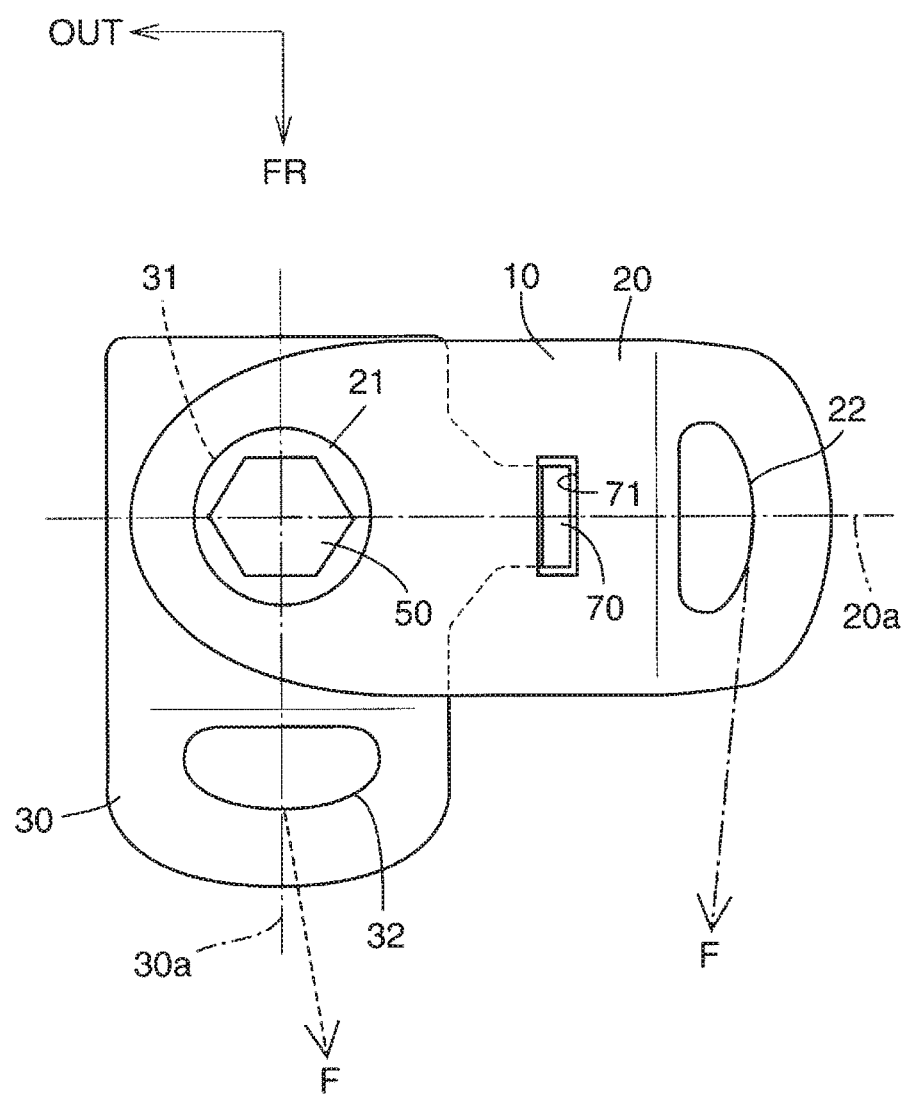
FIG. 2 is an enlarged plan view of the seat belt anchorage for the side seat and the seat belt anchorage for the center seat that are used in the seat belt device according to the embodiment of the disclosure and that are fastened together.

(i) As shown in FIG. 2, the seat belt anchorage 30 for the center seat is provided with a stopper 70 that restrains both the seat belt anchorages 20 and 30 from rotating relatively to each other by coming into contact with the seat belt anchorage 20 for the side seat.

(ii) The coupling portion 32 of the seat belt anchorage 30 for the center seat is arranged such that a force is applied to the seat belt anchorage 30 for the center seat in such a direction as to restrain the seat belt anchorage 20 for the side seat from rotating forward with respect to the vehicle, when the force F is applied to both the seat belt anchorage 20 for the side seat and the seat belt anchorage 30 for the center seat forward with respect to the vehicle.

The aforementioned (i) will be described.

(i-1) Although not shown in the drawing, instead of the seat belt anchorage 30 for the center seat, the seat belt anchorage 20 for the side seat may be provided with the stopper 70, or each of both the seat belt anchorages 20 and 30 may be provided with the stopper 70. That is, it is appropriate that at least one of the seat belt anchorage 20 for the side seat and the seat belt anchorage 30 for the center seat be provided with the stopper 70 that restrains both the seat belt anchorages 20 and 30 from rotating relatively to each other by coming into contact with the other seat belt anchorage. Incidentally, in the embodiment of the disclosure and the example shown in the drawing, a case where only the seat belt anchorage 30 for the center seat is provided with the stopper 70 will be described, unless otherwise specified.

(i-2) The stopper 70 may be formed separately from the seat belt anchorage 30 for the center seat, and fixed to the seat belt anchorage 30 for the center seat. However, it is desirable to form the stopper 70 integrally with the seat belt anchorage 30 for the center seat for the purpose of reducing the number of parts.

(i-3) The stopper 70 is provided in that region of the seat belt anchorage 30 for the center seat which does not include the fastening portion 31 or the coupling portion 32.

(i-4) A fitting hole 71 in which the stopper 70 is fitted is formed through the seat belt anchorage 20 for the side seat with which the stopper 70 comes into contact. Moreover, the seat belt anchorage 20 for the side seat and the seat belt anchorage 30 for the center seat are fastened together to the vehicle body floor 200, with the stopper 70 fitted (inserted) in the fitting hole 71.

(i-5) The fitting hole 71 may be a through-hole that penetrates the seat belt anchorage 20 for the side seat as in the example shown in the drawing. Although not shown in the drawing, the fitting hole 71 may be a recess portion that is provided in the seat belt anchorage 20 for the side seat.

(i-6) The fitting hole 71 is provided in that region of the seat belt anchorage 20 for the side seat which does not include the fastening portion 21 or the coupling portion 22.

The aforementioned (ii) will be described.

(ii-1) The coupling portion 32 of the seat belt anchorage 30 for the center seat is arranged such that a rotating force is applied to the seat belt anchorage 30 for the center seat in a direction opposite to the rotating force that is applied to the seat belt anchorage 20 for the side seat, or that the rotating force of the seat belt anchorage 30 for the center seat becomes equal to zero, when the force F is applied to both the two seat belt anchorages 20 and 30 forward with respect to the vehicle.

(ii-2) The seat belt anchorage 30 for the center seat and the seat belt anchorage 20 for the side seat are fastened to each other while forming an angle in a plan view. In the example of the disclosure shown in the drawing, the angle formed by the centerline 30a of the seat belt anchorage 30 for the center seat in the width direction and the centerline 20a of the seat belt anchorage 20 for the side seat in the width direction is equal to 90°. That is, the seat belt anchorage 20 for the side seat is arranged such that the coupling portion 22 is located closer to the center side in the vehicle width direction than the fastening portion 21 (arranged in such a manner as to be directed toward the center side in the vehicle width direction). Therefore, the seat belt anchorage 30 for the center seat is arranged such that the coupling portion 32 is located in front of the fastening portion 31 with respect to the vehicle (arranged in such a manner as to be directed forward with respect to the vehicle). As a result, the coupling portion 22 of the seat belt anchorage 20 for the side seat is arranged closer to the center side in the width direction of the vehicle than the coupling portion 32 of the seat belt anchorage 30 for the center seat.

Next, the operation and effect of the embodiment of the disclosure will be described.

There is a seat belt anchorage strength test complying with FMVSS, ECE, ADR, and the regulations in Japan or the like. According to this type of test, a body block simulating a human being is fixed to a rear seat of a vehicle, and is pulled forward with respect to the vehicle at a certain load (about 13.5 kN with a three-point belt system). It is stipulated that a seat belt anchorage peripheral structure is required to exhibit a strength satisfying a criterion and endures a prescribed load, that the function of moving and locking a seat is effective normally after the test, that the clearance between lower belt anchorages (an EAP clearance D1) is equal to or greater than 350 mm, and the like.

The coupling portion 22 of the seat belt anchorage 20 for the side seat is arranged in such a manner as to be located closer to the center side in the vehicle width direction than the fastening portion 21. Therefore, when the force F is applied to the seat belt anchorage 20 for the side seat forward with respect to the vehicle in conducting the seat belt anchorage strength test, the seat belt anchorage 20 for the side seat may rotate around the fastening portion 21 forward with respect to the vehicle. When the seat belt anchorage 20 for the side seat rotates forward with respect to the vehicle, the coupling portion 22 of the seat belt anchorage 20 for the side seat moves outward in the vehicle width direction (the inter-EAP distance D1 becomes short). As a result, it may become difficult to ensure that the EAP clearance D1 is equal to or greater than 350 mm.

Thus, in the embodiment of the disclosure, (a) at least one of the seat belt anchorage 20 for the side seat and the seat belt anchorage 30 for the center seat is provided with the stopper 70 that restrains both the seat belt anchorages 20 and 30 from rotating relatively to each other by coming into contact with the other seat belt anchorage. Therefore, when the force F is applied to both the seat belt anchorage 20 for the side seat and the seat belt anchorage 30 for the center seat forward with respect to the vehicle, both the seat belt anchorages 20 and 30 can be restrained from rotating relatively to each other.

Besides, (b) the coupling portion 32 of the seat belt anchorage 30 for the center seat is arranged such that a force is applied to the seat belt anchorage 30 for the center seat in such a direction as to restrain the seat belt anchorage 20 for the side seat from rotating forward with respect to the vehicle, when the force F is applied to both the seat belt anchorage 20 for the side seat and the seat belt anchorage 30 for the center seat forward with respect to the vehicle. Therefore, both the seat belt anchorages 20 and 30 can be restrained from rotating together.

Owing to the aforementioned (a) and (b), when the force F is applied to the seat belt anchorage 20 for the side seat and the seat belt anchorage 30 for the center seat, the seat belt anchorage 20 for the side seat can be restrained from rotating forward with respect to the vehicle due to the seat belt anchorage 30 for the center seat. In consequence, when conducting the seat belt anchorage strength test, the inter-EAP distance D1 between the seat belt anchorage 20 for the side seat and the second seat belt anchorage 40 for the side seat can be restrained from becoming short.

The coupling portion 32 of the seat belt anchorage 30 for the center seat is arranged such that a rotating force is applied to the seat belt anchorage 30 for the center seat in a direction opposite to the rotating force that is applied to the seat belt anchorage 20 for the side seat, or that the rotating force of the seat belt anchorage 30 for the center seat becomes equal to zero, when the force F is applied to both the seat belt anchorage 20 for the side seat and the seat belt anchorage 30 for the center seat forward with respect to the vehicle. Therefore, the force can be applied to the seat belt anchorage 30 for the center seat in such a direction as to restrain the seat belt anchorage 20 for the side seat from rotating forward with respect to the vehicle.

The coupling portion 22 of the seat belt anchorage 20 for the side seat is arranged closer to the center side in the width direction of the vehicle than the coupling portion 32 of the seat belt anchorage 30 for the center seat. Therefore, the inter-EAP distance D1 can be made longer than in the case where the coupling portion 22 of the seat belt anchorage 20 for the side seat is arranged outside the coupling portion 32 of the seat belt anchorage 30 for the center seat in the width direction of the vehicle.

The fitting hole 71 in which the stopper 70 is fitted is formed through the seat belt anchorage 20 for the side seat with which the stopper 70 comes into contact, and the seat belt anchorage 20 for the side seat and the seat belt anchorage 30 for the center seat are fastened together to the vehicle body floor 200, with the stopper 70 fitted in the fitting hole 71. Therefore, the seat belt anchorage 20 for the side seat and the seat belt anchorage 30 for the center seat can be reliably restrained from rotating relatively to each other.

Figure 8:
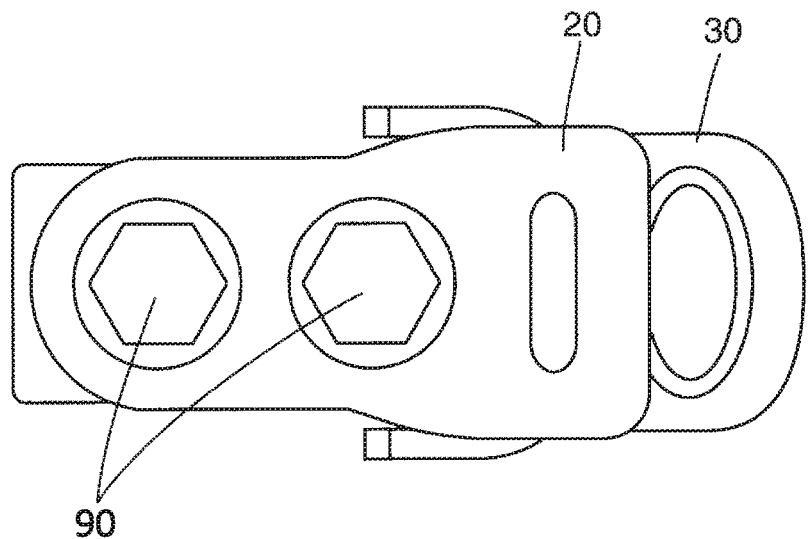
FIG. 8 is a view showing a comparative example that is different from the embodiment of the disclosure, and is a plan view showing a case where a seat belt anchorage for a side seat and a seat belt anchorage for a center seat are fastened together by two bolts.

Only the single fastening portion 21 of the seat belt anchorage 20 for the side seat and only the single fastening portion 31 of the seat belt anchorage 30 for the center seat are provided, and the seat belt anchorage 20 for the side seat and the seat belt anchorage 30 for the center seat are fastened together (fastened) to the vehicle body floor 200, through the use of the single bolt 50. Therefore, the number of parts and the number of man-hours for fastening can be made smaller, and a greater advantage is obtained in terms of cost than in the case where both the seat belt anchorages 20 and 30 are fastened at a plurality of points through the use of a plurality of bolts 90, as indicated by a comparative example of FIG. 8.

Figure 9:
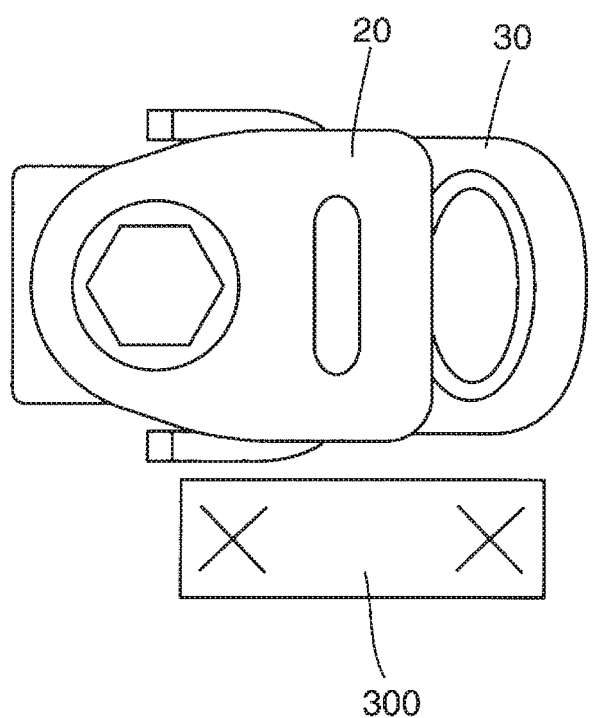
FIG. 9 is a view showing a second comparative example that is different from the embodiment of the disclosure, and is a plan view showing a case where a rotation preventing member is provided around a seat belt anchorage for a side seat and a seat belt anchorage for a center seat that are fastened together.
Figure 10:
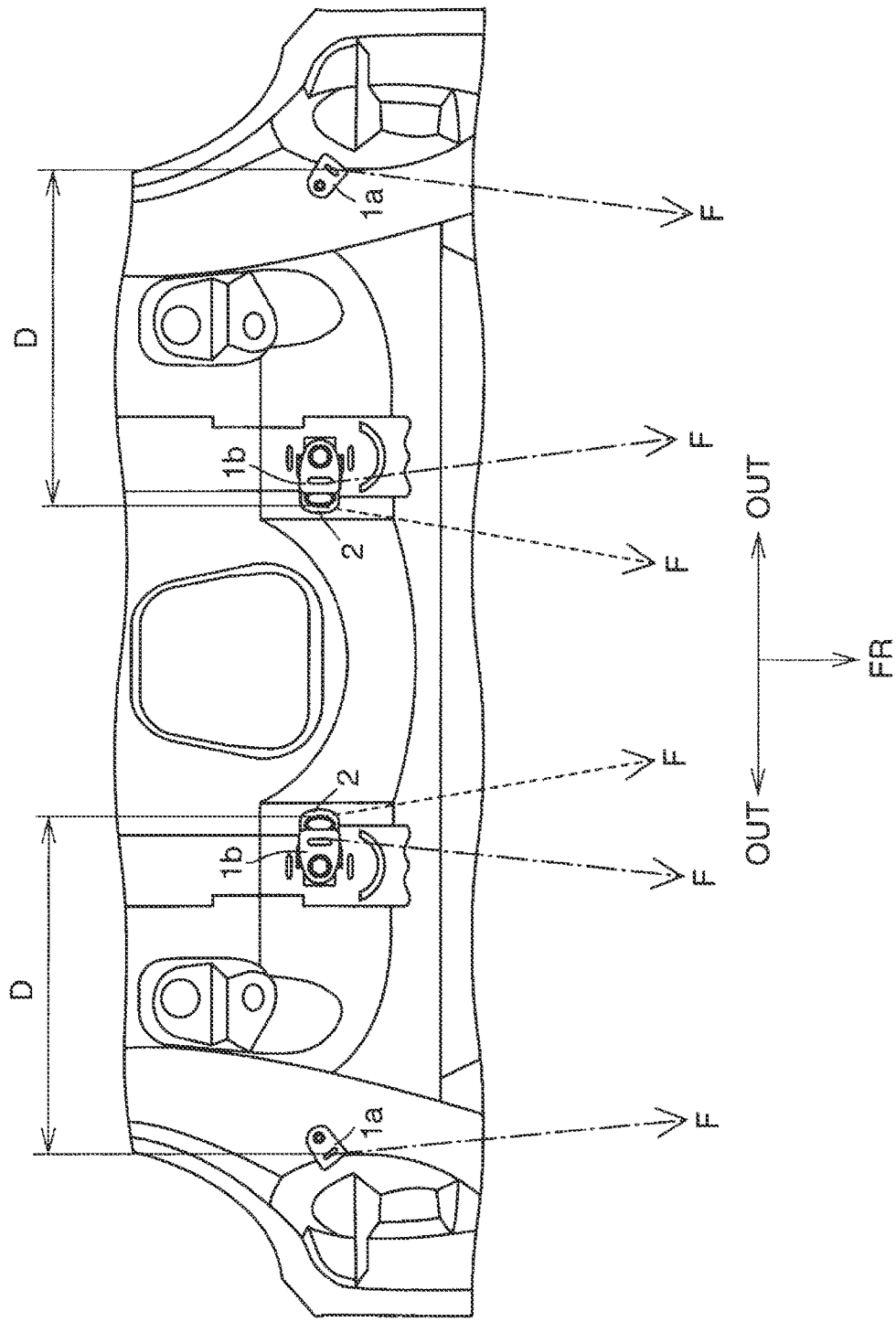
FIG. 10 is a plan view showing a positional relationship between a seat belt anchorage for a side seat and a seat belt anchorage for a center seat that are used in a conventional seat belt device.
Figure 11:
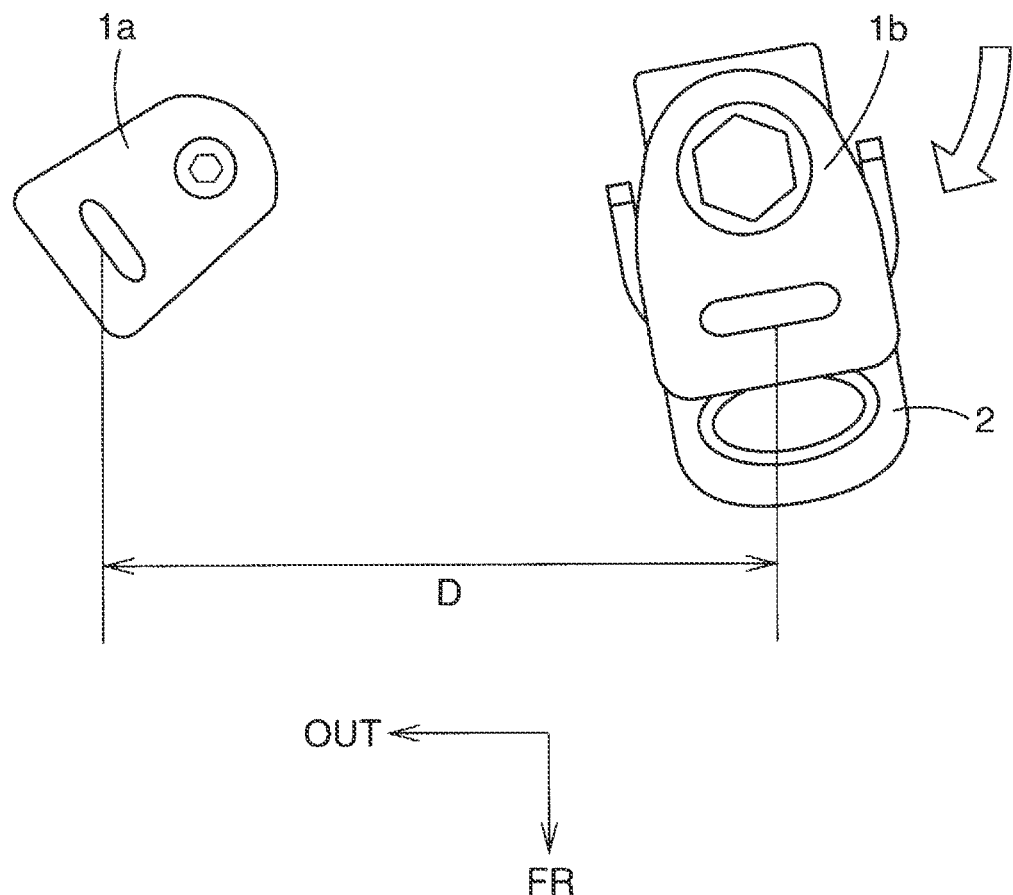
FIG. 11 is an enlarged plan view showing a case where the seat belt anchorage for the side seat and the seat belt anchorage for the center seat that are used in the conventional seat belt device and that are fastened together rotate forward together with respect to a vehicle, due to application of a force to the two seat belt anchorages forward with respect to the vehicle.

The seat belt anchorage 20 for the side seat is restrained from rotating forward with respect to the vehicle, through the use of the seat belt anchorage 30 for the center seat that is fastened together with the seat belt anchorage 20 for the side seat. Therefore, the number of parts can be made smaller and a greater advantage is obtained than in the case where a separate part 300 that keeps the seat belt anchorage 20 for the side seat from rotating is provided in front of the seat belt anchorage 20 for the side seat with respect to the vehicle by, for example, being welded to the vehicle body floor 200, as indicated by a comparative example of FIG. 9.

With the disclosure, the seat belt anchorage 20 for the side seat can be restrained from rotating forward with respect to the vehicle without increasing the number of parts, while fastening together the seat belt anchorage 20 for the side seat and the seat belt anchorages 30 for the center seat.

The seat belt anchorage 20 for the side seat is bilaterally symmetric. Therefore, the seat belt anchorage 20 for the side seat can be shared in common for the side seat on the right side of the vehicle and the side seat on the left side of the vehicle.

What is claimed is:

1. A seat belt device that is fixed to a vehicle body floor through use of a seat belt anchorage, wherein
   the seat belt anchorage has a seat belt anchorage for a side seat and a seat belt anchorage for a center seat that are fastened together by a single bolt to the vehicle body floor,
   the seat belt anchorage for the side seat and the seat belt anchorage for the center seat are equipped with fastening portions that are fastened to the vehicle body floor, and coupling portions that are coupled to seat belts, respectively, and are fastened together to the vehicle body floor at the fastening portions respectively,
   at least one of the seat belt anchorage for the side seat and the seat belt anchorage for the center seat is provided with a stopper that stops both the seat belt anchorages from rotating and moving linearly relatively to each other by coming into contact with the other seat belt anchorage, and
   the coupling portion of the seat belt anchorage for the center seat is arranged such that a force is applied to the seat belt anchorage for the center seat in such a direction as to restrain the seat belt anchorage for the side seat from rotating forward with respect to the vehicle, when a force is applied to both the seat belt anchorage for the side seat and the seat belt anchorage for the center seat forward with respect to the vehicle.

2. The seat belt device according to claim 1, wherein
   the coupling portion of the seat belt anchorage for the center seat is arranged such that a rotating force is applied to the seat belt anchorage for the center seat in a direction opposite to a rotating force that is applied to the seat belt anchorage for the side seat, or that the rotating force of the seat belt anchorage for the center seat becomes equal to zero, when the force is applied to both the seat belt anchorage for the side seat and the seat belt anchorage for the center seat forward with respect to the vehicle.

3. The seat belt device according to claim 1, wherein
   the coupling portion of the seat belt anchorage for the side seat is arranged closer to a center side in a width direction of the vehicle than the coupling portion of the seat belt anchorage for the center seat.

4. The seat belt device according to claim 1, wherein
   a fitting hole in which the stopper is fitted is formed through the other seat belt anchorage with which the stopper comes into contact, and
   the seat belt anchorage for the side seat and the seat belt anchorage for the center seat are fastened together to the vehicle body floor, with the stopper fitted in the fitting hole.

5. The seat belt device according to claim 1, wherein
   each of the seat belt anchorage for the side seat and the seat belt anchorage for the center seat is provided with only the single fastening portion.

6. A seat belt device that is fixed to a vehicle body floor through use of a seat belt anchorage, wherein
   the seat belt anchorage has a seat belt anchorage for a side seat and a seat belt anchorage for a center seat that are fastened together to the vehicle body floor,
   the seat belt anchorage for the side seat and the seat belt anchorage for the center seat are equipped with fastening portions that are fastened to the vehicle body floor, and coupling portions that are coupled to seat belts, respectively, and are fastened together to the vehicle body floor at the fastening portions respectively, at least one of the seat belt anchorage for the side seat and the seat belt anchorage for the center seat is provided with a stopper that stops both the seat belt anchorages from rotating relatively to each other by coming into contact with the other seat belt anchorage, and the coupling portion of the seat belt anchorage for the center seat is arranged such that a force is applied to the seat belt anchorage for the center seat in such a direction as to restrain the seat belt anchorage for the side seat from rotating forward with respect to the vehicle, when a force is applied to both the seat belt anchorage for the side seat and the seat belt anchorage for the center seat forward with respect to the vehicle, wherein a centerline passing through a center of the fastening portion and the coupling portion of the seat belt anchorage for the side seat intersects a centerline passing through a center of the fastening portion and the coupling portion of the seat belt anchorage for the center seat in a top view.

7. The seat belt device according to claim 6, wherein the coupling portion of the seat belt anchorage for the center seat is arranged such that a rotating force is applied to the seat belt anchorage for the center seat in a direction opposite to a rotating force that is applied to the seat belt anchorage for the side seat, or that the rotating force of the seat belt anchorage for the center seat becomes equal to zero, when the force is applied to both the seat belt anchorage for the side seat and the seat belt anchorage for the center seat forward with respect to the vehicle.

8. The seat belt device according to claim 6, wherein the coupling portion of the seat belt anchorage for the side seat is arranged closer to a center side in a width direction of the vehicle than the coupling portion of the seat belt anchorage for the center seat.

9. The seat belt device according to claim 6, wherein a fitting hole in which the stopper is fitted is formed through the other seat belt anchorage with which the stopper comes into contact, and the seat belt anchorage for the side seat and the seat belt anchorage for the center seat are fastened together to the vehicle body floor, with the stopper fitted in the fitting hole.

10. The seat belt device according to claim 6, wherein each of the seat belt anchorage for the side seat and the seat belt anchorage for the center seat is provided with only the single fastening portion, and the seat belt anchorage for the side seat and the seat belt anchorage for the center seat are fastened together to the vehicle body floor through use of a single bolt.

* * * * *